Feb. 28, 1933.   C. LE R. McCUEN   1,899,913
REAR CHASSIS SPRING MOUNTING
Filed Feb. 20, 1931

Inventor
Charles LeRoy McCuen
By Blackmore, Spencer & Hulse
Attorneys

Patented Feb. 28, 1933

1,899,913

UNITED STATES PATENT OFFICE

CHARLES LE ROY McCUEN, OF LANSING, MICHIGAN, ASSIGNOR TO GENERAL MOTORS CORPORATION, OF DETROIT, MICHIGAN, A CORPORATION OF DELAWARE

REAR CHASSIS SPRING MOUNTING

Application filed February 20, 1931. Serial No. 517,155.

This invention relates to motor vehicles and particularly to a cushion mounting for connecting the vehicle load supporting spring to an axle.

One of the objects of the invention is to provide a connection wherein metal to metal contact between certain parts is eliminated and the axle and spring insulated from each other by sound deadening material so that gear noises and the like, originating in the axle, will be effectively damped.

A further object is to provide an improved connection which does not call for any material change or modification in the design of parts heretofore employed but involves merely the addition or incorporation in existing designs of a few simple, low cost parts arranged and constructed in a manner to afford greatly improved riding comfort and to prevent the transmission and amplification of disagreeable sounds and noises.

Various objects and advantages of the invention will be apparent from an inspection of the accompanying drawing when taken in connection with the following specification.

Figure 1:
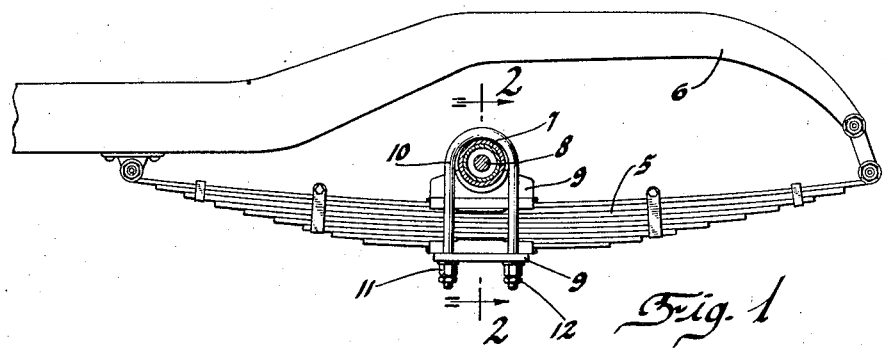
Figure 1 is an elevational view of a portion of the rear end of a vehicle chassis with the axle and load supporting spring connected by means of the present mounting.
Figure 2:
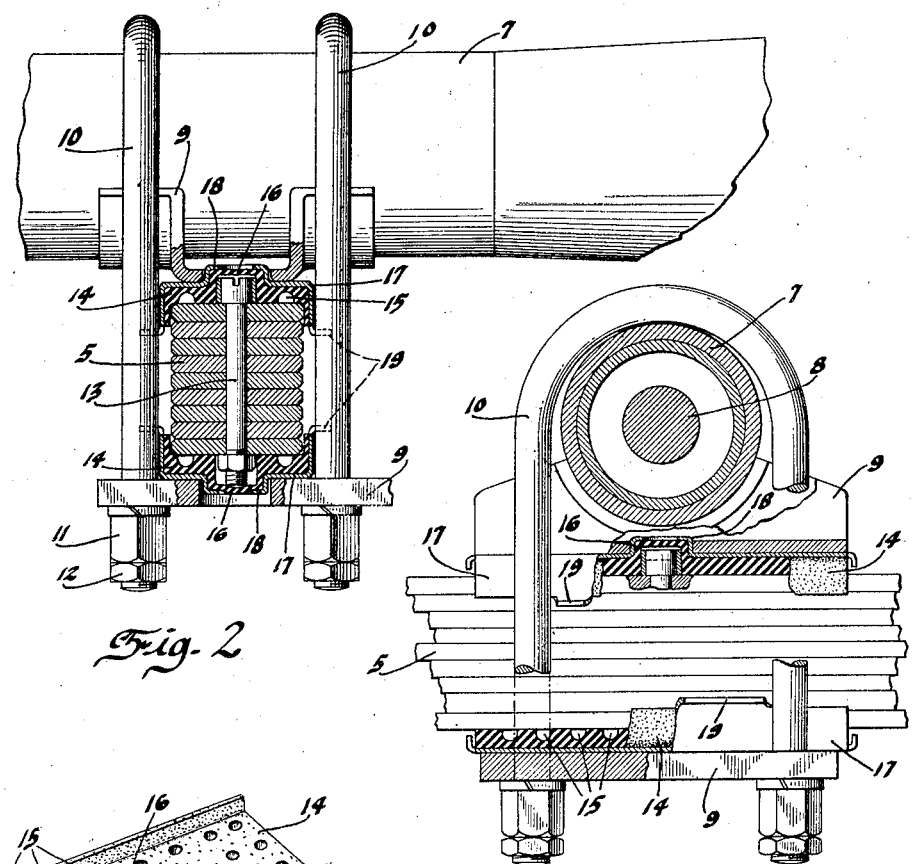
Figure 2 is a transverse section taken on line 2—2 of Figure 1.
Figure 3:
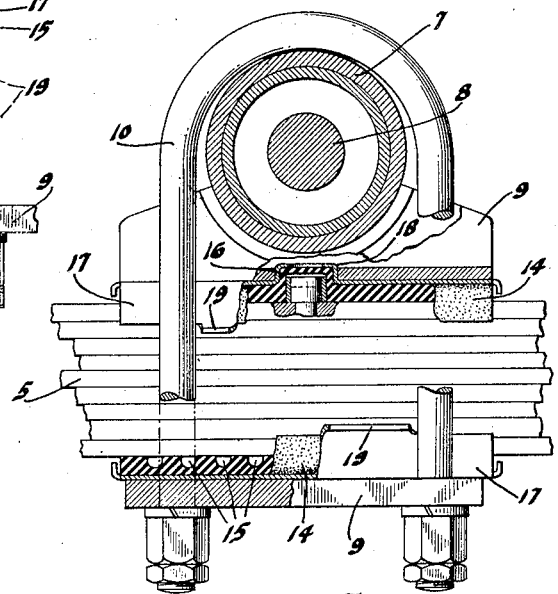
Figure 3 is an enlarged view, partly in section, of the cushion mounting.
Figure 4:
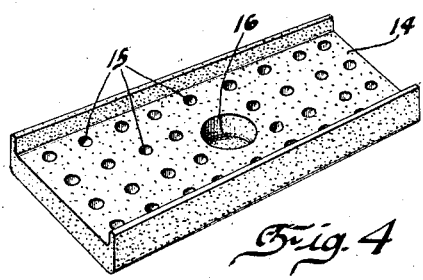
Figure 4 is a detail perspective view of a cushioning pad.

Referring to the drawing, the reference numeral 5 indicates a multiple leaf load supporting spring suitably shackled at opposite ends to the chassis frame 6 and connected at an intermediate point to the axle housing 7 enclosing a driving axle 8. For connecting the axle and spring there are here employed the usual pair of spring pads 9 on the top and bottom sides of the spring and a pair of retaining clips or bolts 10 of U-shape which have their bights engaging the axle housing and their legs passing downwardly on each side of the spring and through the lower spring pad 9 with attachment nuts 11 locked by the nuts 12. Each spring plate 9 is provided at a central point with an aperture or hole for alinement with and to receive opposite ends of an assembly bolt 13 passing through the several leafs at the center thereof.

The construction thus far described is more or less conventional, and it is here proposed to eliminate the metal to metal contacts which usually occurs between the spring and spring pads. For this purpose there is shown in the drawing a pair of cushioning members or straps 14—14 of rubber or the like which for convenience and economy of manufacture may be identical and interchangeable one with the other. Each strap is shown as being of channel shape to receive an adjacent outermost leaf of the spring assembly. If desired, the innermost surface of the base of the channel may be provided with a series of depressions or recesses 15, preferably of semi-spherical shape, to increase resiliency of the pad and provide space for the material thereof to flow. At a central point in the pad there is provided a domed portion 16 which affords on one side a recess or well to receive an adjacent end of the spring bolt 13 and on the opposite side a projection that extends into the aperture of the associated spring pad. In order to confine and protect the rubber pad there may be employed a retainer member 17 stamped from sheet metal and preferably of channel shape in cross section and which is also provided at a central point with a boss or outwardly pressed portion 18 which receives the projection of the dome 16 and extends into the aperture of the spring pad. By providing the domed projection on the rubber pad nested within the boss on the protective retainer and which receives the end of the bolt and projects into the spring pad, complete isolation of the spring and mounting pads is effected, and furthermore, the parts are effectively interlocked or keyed one to another to prevent accidental displacement either longitudinally or transversely. To further locate the several parts and guard against displacement the channeled retainer members 17 may each be provided with terminal outturned flanges 19 along the sides thereof which extend between the legs or pins of the respective U-bolts 10.

From the above description it will be apparent that there is thus provided a cushion mounting which will effectively promote quietness in operation and which is characterized by its simplicity and economical design. While reference herein has been made to a preferred embodiment only, it is to be understood that the form and relation of the parts may be variously modified without departing from the scope of the invention as set out in appended claims.

I claim:

1. In a motor vehicle, the combination with an axle and a load supporting multiple leaf spring having an assembly bolt passing therethru, of a cushioned connection between the axle and spring, including a pair of spaced spring pads carried by the axle on opposite sides of the spring, and each provided with an aperture in registry with the assembly bolt, a strap of elastic deformable material between each pad and an adjacent side of the spring, each strap having an integral domed portion projecting at one side into the registering aperture of the pad and receiving in its other side an adjacent end of the bolt.

2. In a motor vehicle, the combination with an axle and a load supporting multiple leaf spring having an assembly bolt passing therethru, of a cushioned connection between the axle and spring, including a pair of spaced spring pads carried by the axle on opposite sides of the spring, and each provided with a centrally disposed locating hole for the bolt, a resilient strap between each pad and an adjacent side of the spring, each strap having a recess on one side to receive an adjacent end of the bolt and a raised portion on its other side to project into said hole.

3. In a motor vehicle, the combination with an axle and a load supporting multiple leaf spring having an assembly bolt passing therethru, of a cushioned connection between the axle and spring, including a pair of spaced spring pads carried by the axle on opposite sides of the spring, and each provided with a centrally disposed locating hole for the bolt, a resilient strap between each pad and an adjacent side of the spring, each strap having a recess on one side to receive an adjacent end of the bolt and a raised portion on its other side to project into said hole, and a channel shaped retainer for each strap interposed between the strap and adjacent pad and provided with a projection receivable within said hole to key the parts together.

4. In a motor vehicle, the combination with an axle and a load carrying spring of a cushioned connection between the axle and spring including a pair of spring pads between which the spring extends, a pair of U-bolts engaging the axle and extending one on each side of the spring for securing to the axle said pads, straps of resilient material interposed between said pads and adjacent parts of the spring, and retainer members of substantially channel shape enclosing said straps and having along their sides lateral projections extending between the legs of the U-bolts for locating the same.

5. A cushion connection including in combination with a multiple leaf load carrying spring having an assembly element therethru and an axle provided with a pair of spaced pads, one on each side of the spring and each having a recess in alignment with said assembly element, of a cushioning member and a retainer therefor interposed between each pad and an adjacent part of the spring, and offset portions on both the cushioning member and the retainer, nested one within the other and seated within the recess and about a part of said element.

6. A cushion connection, including in combination, a load carrying spring having a projection thereon, an axle provided with a pair of spaced pads, one on each side of the spring and each having a recess aligned with said projection, a cushion member and a retainer therefor, interposed between each pad and the spring, and offsets on the cushion member and retainer respectively arranged for nested engagement with each other and with said projection and recess.

7. A cushion connection, including in combination, a load carrying spring, an axle provided with spring pads on opposite sides of the spring, a cushion member and a retainer therefor between each pad and the spring, and interlocking means cooperatively associated with the spring, the cushion member, the retainer and the pad in successively nested relations one within the other.

8. An axle and spring connection wherein a pair of U-bolts embrace the axle and extend on opposite sides of the spring for clamping the spring between a pair of pads, characterized by a cushion interposed between the spring and a pad and provided with a dome to receive a projection on the spring and to project into an alined opening in the pad, and a retainer plate for said cushion, provided with a raised boss receiving said dome and fitting said pad opening to locate the parts and with a lateral extension projecting from one side into the space between the legs of an adjacent U-bolt to further locate said parts.

In testimony whereof I affix my signature.

CHARLES LE ROY McCUEN.